(12) United States Patent
Mattina et al.

(10) Patent No.: US 7,620,954 B2
(45) Date of Patent: Nov. 17, 2009

(54) MECHANISM FOR HANDLING LOAD LOCK/STORE CONDITIONAL PRIMITIVES IN DIRECTORY-BASED DISTRIBUTED SHARED MEMORY MULTIPROCESSORS

(75) Inventors: Matthew C. Mattina, Hudson, MA (US); Carl Ramey, Auburn, MA (US); Bongjin Jung, Westford, MA (US); Judson Leonard, Newton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1863 days.

(21) Appl. No.: 09/924,934

(22) Filed: Aug. 8, 2001

(65) Prior Publication Data

US 2003/0041225 A1 Feb. 27, 2003

(51) Int. Cl.
*G06F 3/00* (2006.01)
*G06F 13/00* (2006.01)

(52) U.S. Cl. .................... 719/311; 711/130; 711/131; 711/152

(58) Field of Classification Search ......... 711/117–149, 711/152; 709/212–216; 718/104, 108; 719/312–314, 719/311; 707/8, 9, 201
See application file for complete search history.

(56) References Cited

U.S. PATENT DOCUMENTS

| | | | | |
|---|---|---|---|---|
| 5,887,138 A | * | 3/1999 | Hagersten et al. | 709/215 |
| 5,937,199 A | * | 8/1999 | Temple | 710/262 |
| 6,108,764 A | * | 8/2000 | Baumgartner et al. | 712/28 |
| 6,141,734 A | * | 10/2000 | Razdan et al. | 711/144 |
| 6,185,658 B1 | * | 2/2001 | Arimilli et al. | 711/133 |
| 6,266,744 B1 | * | 7/2001 | Hughes et al. | 711/146 |
| 6,275,907 B1 | * | 8/2001 | Baumgartner et al. | 711/143 |
| 6,425,050 B1 | * | 7/2002 | Beardsley et al. | 711/113 |
| 6,438,671 B1 | * | 8/2002 | Doing et al. | 711/173 |
| 6,748,498 B2 | * | 6/2004 | Gharachorloo et al. | 711/141 |
| 7,069,306 B1 | * | 6/2006 | Lenoski et al. | 709/213 |
| 2001/0010068 A1 | * | 7/2001 | Michael et al. | 711/119 |
| 2004/0093467 A1 | * | 5/2004 | Shen et al. | 711/141 |

* cited by examiner

*Primary Examiner*—Hyung S Sough
*Assistant Examiner*—Charles E Anya

(57) ABSTRACT

Each processor in a distributed shared memory system has an associated memory and a coherence directory. The processor that controls a memory is the Home processor. Under certain conditions, another processor may obtain exclusive control of a data block by issuing a Load Lock instruction, and obtaining a writeable copy of the data block that is stored in the cache of the Owner processor. If the Owner processor does not complete operations on the writeable copy of the data prior to the time that the data block is displaced from the cache, it issues a Victim To Shared message, thereby indicating to the Home processor that it should remain a sharer of the data block. In the event that another processor seeks exclusive rights to the same data block, the Home processor issues an Invalidate message to the Owner processor. When the Owner processor is ready to resume operation on the data block, the Owner processor again obtains exclusive control of the data block by issuing a Read-with Modify Intent Store Conditional instruction to the Home processor. If the Owner processor is still a sharer, a writeable copy of the data block is sent to the Owner processor, who completes modification of the data block and returns it to the Home processor with a Store Conditional instruction.

28 Claims, 4 Drawing Sheets

| ADDRESSES OF SHARERS OR OWNER | STATUS |

FIG 4

MECHANISM FOR HANDLING LOAD LOCK/STORE CONDITIONAL PRIMITIVES IN DIRECTORY-BASED DISTRIBUTED SHARED MEMORY MULTIPROCESSORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system with multiple processors. More preferably, the present invention generally relates to the sharing of data among processors in a Distributed Shared Memory ("DSM") computer system. Still, more particularly, the invention relates to a high performance directory based cache coherence protocol that permits processors in a DSM system to make more efficient use of their cache memory resources.

2. Background of the Invention

Distributed computer systems typically comprise multiple processors connected to each other by a communications network. In some distributed computer systems, the processors can access shared data. Such systems are sometimes referred to as parallel computers. If a larger number of processors are networked, the distributed system is considered to be a "massively" parallel system. One advantage of a massively parallel computer system is that it can solve complex computational problems in a relatively short time period.

In parallel and massively parallel computer systems, it has become common to distribute memory throughout the computer system, and to permit most or all of the processors to access data stored in the distributed memory, regardless of where the memory is located. Such a shared memory architecture is conventionally known as a Distributed Shared Memory ("DSM") system. One of the challenges that faces a system designer of a DSM system is to ensure that the data is stored and retrieved in a coherent manner. In particular, the system designer must implement a protocol for handling data that ensures that two different processors don't concurrently modify the same piece of data, and try to save that data back to the same memory location. Thus, to guarantee the coherency of the data in memory, steps must be taken to permit only one processor to modify any particular memory location at any one time.

Recently, DSM systems have been built as a cluster of Symmetric Multiprocessors ("SMP"). In SMP systems, shared memory can be implemented efficiently in hardware since the processors are symmetric (e.g., identical in construction and in operation). It has become desirable to construct large-scale DSM systems in which processors efficiently share memory resources. Thus, the system preferably supports having a program executing on a first processor fetch data stored in a section of system memory that operates under the control of a second processor.

It has become commonplace to provide memory caches (or cache memory) with processors. The memory cache typically is located on the same semiconductor device as the processor (an L1 cache), or is located immediately adjacent the processor, and connected to the processor by a high-speed data bus (an L2 cache). Memory devices used for cache memory usually comprise very high-speed devices, thus permitting much faster access times than standard system memory. The drawback, however, is that cache memory is relatively expensive, and relatively large in size. Thus, cache memory typically has a small data capacity relative to the system memory. The processor uses these high-speed cache memory devices to store data that is either being used repeatedly by the processor, or to store data expected to be used by the processor. Because of the small size of the cache, data is displaced from the cache if it is not used. The displaced data is then re-stored in the system memory. Usually, data is read from the system memory into cache memory, where it is modified by the processor. When the processor has completed modification of data, the data is displaced, and written back to the system memory.

During normal operation, when the processor needs a particular piece of data, it first looks in its associated cache memory. If the desired data is in the cache memory, that is referred to as a "cache hit", and the processor then performs any necessary operations on the version of data in the cache. If the desired data is not in the associated memory cache(s), that is referred to as a "cache miss", and the processor then retrieves the data from system memory and stores a copy in the cache for further operations. The fact that each processor in a multi-processor system has its own cache greatly complicates the problem of data coherency. In particular, a problem can arise if multiple processors have made a cache copy of the same data from system memory. The processors then may proceed to modify, in different ways, the copy of the data stored in the processors' associated caches. The various modified copies of data stored in each cache memory raise the specter that multiple inconsistent versions may exist of what was originally the same data obtained from the same memory location. A coherency protocol thus must be implemented that mitigates these concerns to prevent inconsistent versions of the same data from being created, or more particularly, from being indeterminately being written back to system memory.

Because the size of computer systems continues to increase at a rapid rate, and because massively parallel computer systems are being developed with an ever-increasing number of processors, it is desirable if the coherency protocol is scaleable to processor configurations of various sizes. One technique that has been adopted in large multi-processor systems is to implement a directory-based cache coherence system. In a directory based solution, a directory is maintained for all of the memory in the system. Typically, like the system memory, the directory is distributed throughout the computer system. According to conventions developed by the assignee of the present invention, each processor is assigned the responsibility of controlling some portion of the distributed system memory. With respect to that portion of system memory under the control of a given processor, that processor maintains a directory that identifies which portions of that memory have been copied by a processor. In this fashion, it is possible to determine if a particular block of data has already been copied. Various instructions are then used to determine which data is valid in the system, and what data must not be used or must be flushed to make sure that data is maintained coherently.

Most reduced instruction set core ("RISC") processors use "Load Lock" and "Store Conditional" instructions to ensure synchronization in multiprocessor distributed shared memory architectures. A processor uses the "Load Lock" and "Store Conditional" instructions when it seeks exclusive access to a block of data (which is located in a particular memory address range), so that it is the only processor that can manipulate that data during the period that Load Lock is asserted. Thus, the processor issues a "Load Lock" instruction for a block of data coincidentally with reading that data block and storing a copy in the cache memory of that processor. After the data is manipulated, the processor then issues the "Store Conditional" instruction, which causes the data to be re-written to the original memory location where the data resided, at which time the memory block is released. If that section of memory has been written to in the interval between when "Load Lock" and "Store Conditional" was asserted, the "Store Conditional" instruction fails. Thus, the "Store Conditional" instruction is a conditional instruction that only executes (i.e., that only stores) if the data in that memory location has not been modified since the Load Lock instruction was issued.

As an example and referring to FIG. 1, assume four processors A, B, C and D have shared access to memory locations M, N, O and P. Memory M operates under control of processor A, memory N operates under control of processor B, and so on. If processor A seeks exclusive access to memory block X in memory O, it will issue a "Load Lock" instruction for that block of memory to the processor responsible for block X (which happens to be processor C), and that processor records in its directory (shown as "D") that processor A has a copy of that memory block. If, while the "Load Lock" is active, processor B writes to that same memory block X, processor A must be informed of that event, so that processor A can determine that the "Load Lock" has failed. In operation, processor A learns of the write operation during "Load Lock" when "Store Conditional" is executed.

A "Load Lock" instruction may be used in situations where a programmer desires serialized access to a location that is shared in a distributed memory, multi-processor system. Thus, "Load Lock" may be used in situations where multiple processors are instructed to modify a block of data in a specific order (processor A modifies the data, followed by processor B, followed by processor D, . . . ).

As mentioned above, DSM systems typically include a directory that records which memory locations have had data read out and stored in the local cache of a processor. The directory may be located anywhere in the computer system, and essentially comprises a table with entries corresponding to each block of memory. Typically, the directory is fragmented, and multiple processors are responsible for certain portions of the directory. Typically, control of the memory is distributed among various processors, and each processor maintains the directory for the portion of memory for which it is responsible. In the example, processor C is responsible for controlling memory block X in memory O, and processor C includes a directory for memory O, with an entry that indicates that processor A has made a copy of block X. When processor B writes to that same memory block X, the directory causes an "Invalidate" or "Shared Invalidate" instruction to be sent to circuitry within processor A, informing processor A that the block of data copied from memory block X is now invalid due to the write operation by processor B. In response, processor A will flush that data from its cache memory, since it is no longer valid.

A block of memory can be requested as a writeable copy (i.e., a copy of the memory block with authority to modify the block), or a read-only copy (which can be read, but not modified). If processor A requests a read-only copy of memory block Y in memory P, and does not issue a "Load Lock" instruction, the directory for block Y in processor D records that processor A has a read-only copy of memory block Y, which is commonly referred to as a "shared" state. If another processor were to write to memory block Y, then the directory for processor D would issue an instruction to processor A invalidating the read-only copy of memory block Y.

If processor A instead requests a writeable copy of block Y, that is referred to as an "exclusive" state, because only processor A has access to memory block Y. If, however, processor A begins working on other data, and the writeable copy of block Y is displaced from the cache memory of processor A, the data is returned to memory block Y, together with a "victim" instruction. The "victim" instruction clears the exclusive state of that memory block Y, and the directory in processor D for memory P no longer shows any association with processor A. If another processor then obtains a writeable copy of block Y, and modifies block Y, than the directory in processor D will not notify processor A because there is no longer any association of block Y with processor A. If processor A then subsequently executes a Store Conditional on block Y, it will be unaware that block Y has been modified, and the directory will not detect this event. Thus, between the assertion of "Load Lock" and "Store Conditional" by processor A, a different processor may cause the data that was the subject of these instructions to be modified. As a result, data incoherency exists because the data was not handled in the proper order specified by the programmer.

To prevent this situation from occurring, most conventional designs do not allow the writeable copy to be displaced or evicted from the cache until the "Store Conditional" instruction executes. Instead, conventional designs require that writeable copies of memory be locked in the cache until operation on that copy is completed. This prevents subsequent writes to the same block from going undetected. This approach of locking the cache, however, ties up cache resources. In a multithreaded system where multiple programs can execute simultaneously on the same processor, this can severely impact performance of the system. As an example, block Y may be copied by processor A for program 1, but program 2 begins executing on Processor A. Unfortunately, the cache of processor A may become full, because instructions have also been fetched for program 1. It would be desirable if processor A could free its cache to operate expeditiously on program 2, if necessary. Under conventional implementations, block Y could not be evicted from the cache associated with processor A until operations are complete on block Y and the data has been conditionally stored. Despite the apparent inefficiencies such an approach produces, to date no one has developed an efficient solution to this problem.

BRIEF SUMMARY OF THE INVENTION

The problems noted above are solved in large part by a multiprocessor distributed shared memory system in which a processor may obtain exclusive control of a data block by asserting a Load Lock signal to the Home processor that controls that data block If the processor with exclusive control does not complete operations on the data block prior to the time that the data block is displaced from the cache of that processor, it issues a Victim To Shared message, thereby indicating to the Home processor that it should remain a sharer of the data block, and the data block is written back. In the event that another processor seeks exclusive rights to the same data block, the Home processor issues an Invalidate message to what was previously the Owner processor. This causes that processor to recognize that the Load Lock/Store Conditional operation pair has failed. If no Invalidate message is received, and when the processor executes the Store Conditional instruction, it seeks exclusive control of the data block by issuing a Read with Modify Intent Store Conditional message to the Home processor. If that processor is still a sharer, a writeable copy of the data block is sent to that processor, who completes modification of the data block. If the Home processor does not recognize that processor as a sharer of that data block, this indicates to the Home processor that an intervening write has occurred, and the Home processor returns a Store Conditional Failure message.

According to one embodiment of the invention, each processor in a multiprocessor system includes a directory that maps the status of each data block in an associated memory. Each processor also includes a cache memory in which data is stored that is currently being used by the processor. If instructed by a program, one of the processors may assert a Load Lock instruction to the directory of another processor, thereby obtaining exclusive possession of a block of data from the memory associated with the other processor. The data block is then stored in the cache memory of the requesting processor. If the requesting processor does not complete operation on the data block prior to the time that the data block is displaced from its cache, it returns the data block to the memory location, and instructs the directory that it needs to be recognized as a sharer to that data block. As a result, if other processors or system resources seek to modify that data block, the directory sends an Invalidate message to the requesting processor to notify that processor that its shared data is now invalid. If the requesting processor does not receive an Invalidate message, that processor may seek to again obtain an exclusive copy of the data block by asserting a Read-with Modify Intent Store Conditional instruction.

According to an exemplary embodiment, each processor preferably includes a Load Lock register associated with each program thread. The Load Lock register stores the address of any data block over which that processor has obtained exclusive control through the assertion of a Load Lock instruction. Each time that data is expelled from the cache, the address of the expelled data block is compared to the address value in the Load Lock register. If a match occurs, the processor returns the data with a Victim To Share message, instead of a Victim message, thereby informing the Home processor that the processor returning the Victim To Share message should remain as a sharer to the data block.

These and other features of the present invention will become apparent upon reading the following description and claims and reviewing the appended drawings.

BRIEF DESCRIPTION OF THE DRAWINGS

For a detailed description of the preferred embodiments of the invention, reference will now be made to the accompanying drawings in which:

FIG. 4 illustrates a portion of a memory coherence directory in accordance with the preferred embodiment of FIG. 2.

NOTATION AND NOMENCLATURE

Certain terms are used throughout the following description and claims to refer to particular system components. As one skilled in the art will appreciate, processor and computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. The term "CPU", "processor", and "microprocessor" are used synonymously to broadly refer to the device in a computer system that interprets and executes programmed instructions. The term "Home processor" refers to a processor that manages the memory and directory for a particular data block. The term "Owner processor" refers to a processor that manages an exclusive copy of a data block in its cache. The term "sharer" refers to a processor that manages a shared copy of a data block in its cache. The term "shared" refers to data that has been copied by one or more processors. To the extent that any term is not specially defined in this specification, the intent is that the term is to be given its plain and ordinary meaning.

DETAILED DESCRIPTION OF THE PREFERRED EMBODIMENTS

Figure 1:
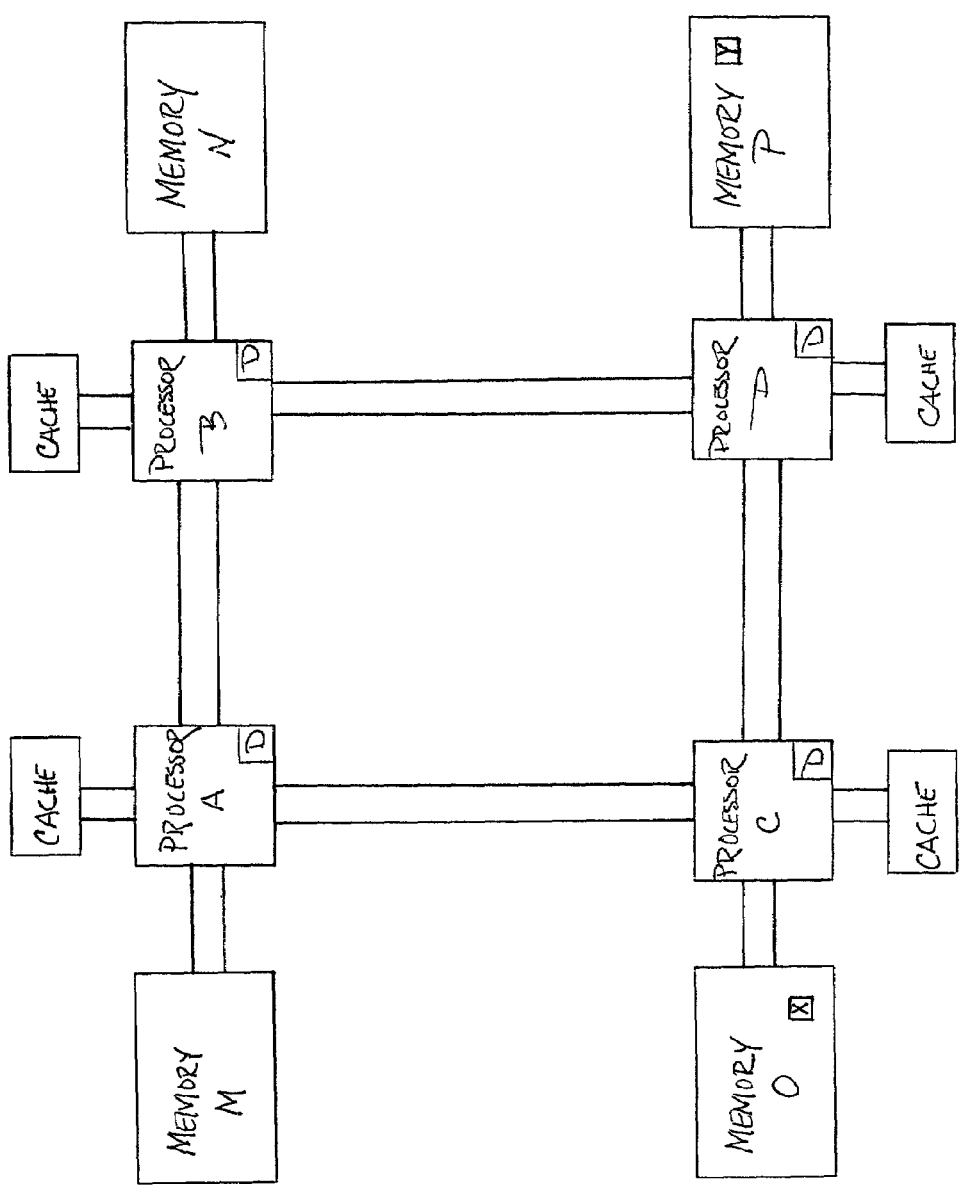
FIG. 1 shows a portion of a conventional distributed shared memory system for purposes of illustration.
Figure 2:
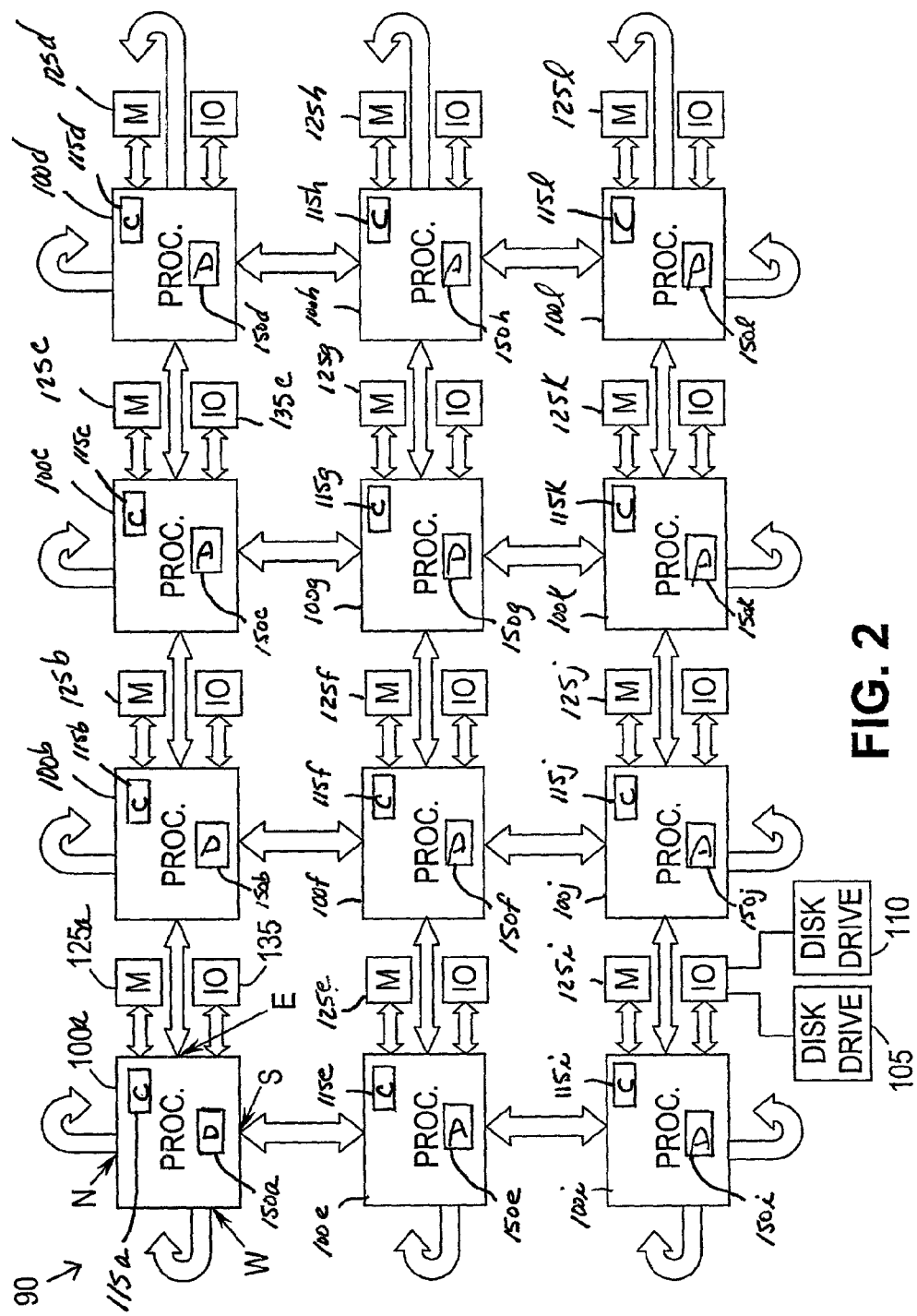
FIG. 2 is a block diagram of a multiprocessor distributed processing system constructed in accordance with the preferred embodiment.

Referring now to FIG. 2, an exemplary computer system 90 is shown to illustrate the principles of the present invention. As shown in FIG. 2, computer system 90 comprises a plurality of processors 100, each of which has an associated memory 125 and an input/output ("I/O") controller 135. In FIG. 2, the computer system 90 includes twelve processors 100a-l for purpose of illustration. Each processor preferably includes four ports for connection to adjacent processors. As such, each processor 100 can be connected to four other processors. The processors on both ends of the system layout (e.g., 100a and 100d) wrap around and connect to implement a 2D torus-type connection. Although twelve processors 100a-l are shown in the exemplary embodiment of FIG. 1, any desired non-prime number of processors (e.g., 64, 128, 256, etc.) can be included.

As noted, each processor may have an associated I/O controller 135. The I/O controller 135 provides an interface to various input/output devices such as disk drives 105 and 110, as shown in the lower, left-hand corner of FIG. 2. Data from the I/O devices thus enters the 2D torus via the I/O controllers.

The system memory in computer system 90 comprises a distributed memory architecture, with the memory dispersed throughout the system. According to the preferred embodiment, each processor 100 has an associated memory device 125. In accordance with the preferred embodiment, the memory 125 preferably comprises some form of synchronous DRAM, including SDRAM, DDR DRAM, or RDRAM memory devices, but other types of memory devices can be used, if desired. The capacity of the memory device 125 can be any suitable size. According to the preferred embodiment, discrete memory devices 125a-l, in aggregate, form the system memory of the computer system 90. Each processor preferably includes appropriate logic for controlling the operation of the portion of the distributed memory to which it connects. Thus, for example, processor 100c couples to and controls discrete memory 125c. As an alternative, memory may be associated only with select processors.

In general, computer system 90 preferably are configured so that any processor 100 can access its own memory and I/O devices, as well as the memory and I/O devices of all other processors in the system. Thus, as an example, processor 100g can access memory device 125b, or any other portion of the distributed memory 125a-l in the computer system. Preferably, the computer system may have physical connections between each processor resulting in low inter-processor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Referring still to FIG. 2, and in accordance with normal convention, each processor 100a-l preferably includes at least one memory cache 115. Thus, as shown in FIG. 2, each processor 100a-l has an associated memory cache 115a-l. More preferably, each processor includes more than one memory cache, and may for example include both a level one ("L1") cache and a level two ("L2") cache. While the cache 115 is shown integrated with the processor 100, one skilled in the art will understand that one or more of the memory caches may be located off-chip. In accordance with normal convention, the L1 cache preferably is located on-chip while the L2 chip is located off-chip. As one skilled in the art will understand, the processor retrieves data from one or more of the distributed memory devices 125a-l during the course of executing one or more programs. Data that is likely to be used or re-used by the processor is stored in one of the memory caches 115 of the processor. In the event that the data is not used, the data may be displaced from the cache and stored back in the distributed memory system 125a-l. Storage of often-used data in the cache 115 reduces the time that would otherwise be required to retrieve data from the distributed memory system 105a-l. According to the preferred embodiment, the possible cache states include those listed in Table 1.

TABLE 1

CACHE STATES

| STATE | MEANING |
|---|---|
| Invalid | Block has been invalidated and a correct copy must be obtained from memory. |
| Exclusive-Clean | This processor has an exclusive copy, the value is the same as system memory. |
| Exclusive-Dirty | This processor has an exclusive copy, the value may be different than memory. |
| Shared | This processor has a read-only copy, the value is the same as memory. |

To write to a data block in system memory (other than the local memory of that processor), the processor preferably must have a data block with a Dirty cache state.

To ensure data coherency, each processor 100 preferably includes a memory coherence directory 150 that reflects the status of each block of memory in the portion of the distributed memory system associated with and under control of that processor. Thus, for example, memory coherence directory 150d reflects the status of memory 125d. In particular, the directory 150 tracks which processor has obtained a copy of a particular memory block, and also whether the copy is a read only copy (and thus can be shared) or whether the copy is a writeable copy (and thus is exclusive).

Figure 4:
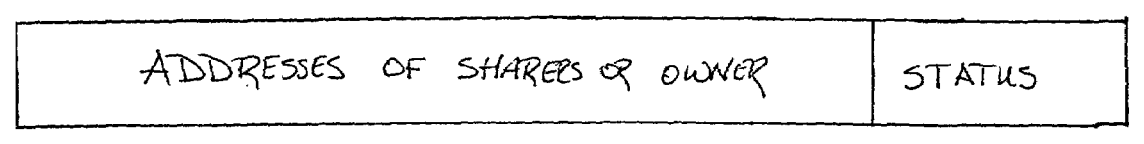

The directory may exist in registers or memory within the processor, or may be physically located in a memory external to the processor, including the portion of system memory associated with that processor. FIG. 4 is a conceptual illustration of one register that may be used to store status information for one block of memory. A plurality of similar registers would be provided, with one register associated with each memory block. In accordance with an exemplary embodiment, each register is dedicated to a particular memory block. As an alternative, the register may include additional bits to permit identification of a particular memory block. As shown in FIG. 4, the register includes two primary fields. The first field identifies the status of the memory block, and indicates whether a copy of the data in the memory block has been copied to a processor. Further, the status bits preferably also indicate if the copy of the data block is a read-only copy, or whether the copy is writeable. The second portion of the register identifies the processor or processors that have obtained copies of the data block. Thus, each processor in the computer system is identified by a binary code, to enable the directory to track processors that have access to a memory block. According to an exemplary embodiment, local memory accesses from the Home processor need not be tracked in the memory coherence directory. Any remote requests, however, preferably are used to update the directory as a mechanism to globally track the status of each data block.

As shown in Table 2, there are at least six different states that may be used to identify the status of a data block in the memory coherence directory 150:

TABLE 2

DIRECTORY STATES

| STATE | MEANING |
|---|---|
| Local state | Implies that no remote processors have a copy of the block. |
| Incoherent state | An error state. Error status ("ERRResp") is returned in response to a request to an incoherent block. |
| Exclusive state | Implies that exactly one remote processor holds the current copy of the block. The block may be either in the exclusive-clean or dirty states in the cache at that processor. |
| Shared1 | Implies that one remote processor may have shared access to a block (as well as the local processor). |
| Shared2 | Implies that two processors may have shared copies of the block (as well as the local processor). |
| Shared3 | Implies that three processors may have shared copies of the block (as well as the local processor). To permit encoding of the three processors, a fewer number of processors may be required. |

The number of bits used to encode the state of a data block may be arbitrarily chosen, depending on the number of states available, and the amount of detail that is to be tracked. Similarly, the number of bits used to identify the processor or processors with access to the data block may also be chosen arbitrarily, depending on the number of processors in the system, and the number of processors who can concurrently share data. An example of the type of data that be encoded in the memory coherence directory is shown in Table 3. According to this exemplary embodiment, the four least significant bits are used to identify status of the memory block, while the eighteen most significant bits may be used to identify the processor or processors that have copies of the memory block, as follows:

TABLE 3

DIRECTORY STATE ENCODING

| STATE | ENCODING: | COMMENTS |
|---|---|---|
| Local | XXXXXXXXXXXXXXXXXX0000 | |
| Incoherent | XXXXXXXXXXXXXXXXXX1000 | |
| Exclusive | XXXXXXXXXXEEEEEEEEI100 | |
| Shared1 | XXXXXXXXXXSSSSSSSS1110 | Shared with list of one share-S |
| Shared2 | XXTTTTTTTTSSSSSSSS0110 | Shared with list of two shares-T,S |

TABLE 3-continued

DIRECTORY STATE ENCODING

| STATE | ENCODING: | COMMENTS |
|---|---|---|
| Shared3 | UUUTTTTTTUUSSSSSSU0010 | Shared with list of three sharers-U,T,S |

Each symbol's meaning is below:
X Don't care;
I Tells whether the exclusive owner is a DMA device (1 = DMA).
E Eight bits identifying exclusive owner (for up to 256 processors);
S bits used to identify the first sharer;
T bits used to identify the second sharer;
U bits used to identify the third sharer.

The foregoing table is only for purposes of illustration, and is not intended to limit the manner in which status data is encoded in the memory coherence directory.

One of the coherence protocol messages found in many DSM multi-processor systems is a "Victim To Shared" message. The present invention uses this message in a unique way to handle data that has been displaced from a cache prior to issuing a Store Conditional instruction. Thus, in accordance with the present invention, when an exclusive (or a writeable) cache block x is displaced from a cache, the Owner processor checks to see if it has previously executed a Load Lock instruction for that cache block x. If the Owner processor discovers that it has previously issued a Load Lock (but not a Store Conditional instruction), the Owner processor preferably sends a Victim To Shared message to the Home directory, rather than the standard Victim message. The Victim To Shared message indicates that the Owner processor is no longer the exclusive owner of the data block, but that it desires to continue to share the data block. Thus, by issuing the Victim To Shared message, the processor continues to be listed as a sharer of that data block in the associated directory of the Home processor for that data block. As a result, if any other processor subsequently attempts to write to that data block before the Store Conditional instruction is issued, the processor that issued the Victim To Shared instruction will receive an Invalidate message from the Home directory, thereby causing the failure of the Load Lock/Store Conditional operation, and thus maintaining coherency.

The foregoing concept will now be illustrated with reference to FIG. 2. Assume processor 100a obtains exclusive control of a block X of data from memory 125d by issuing a Load Lock signal. Directory 150d in processor 100d will update its table to indicate that processor 100a has exclusive control of data block X. Block X is then loaded into the cache 115a of processor 100a. Prior to the time that processor 100a completes operation on data block X, processor 100a may begin to execute another program, or otherwise begin processing some other instructions not pertinent to block X. As a result, cache 115a desires to expel block X to make room for other data that is currently being used by the processor 100a, as dictated by the cache algorithms that control which data is stored in the cache 115a. Before displacing block X from its cache, processor 100a determines if it has previously issued a Load Lock instruction for data block X. If so, then processor 100a returns the data to processor 100d, and sends a Victim To Shared message to Directory 150d. As a result, the directory 150d changes the status of data block X to note that processor 100a is no longer the exclusive owner of data block X. However, because of the Victim To Shared message (instead of the Victim message), directory 150d lists processor 100a as a sharer of data block X. In the event that that another processor subsequently attempts to write to data block X before processor 100a executes the Store Conditional instruction, processor 100a will receive an Invalidate message from directory 150d. In response, processor 100a will fail the Load Lock/Store Conditional operation.

If, instead, processor 100a executes the Store Conditional instruction for data block X, prior to receiving an Invalidate signal from directory 150d, processor 100a sends a Read-with-Modify Intent Store Conditional ("RdModSTC") instruction to the directory 150d. Stated differently, when the Store Conditional half of the Load Lock/Store Conditional pair is executed and misses in the cache, the message RdModSTC is transmitted to the targeted directory.

If the directory 150d finds that processor 100a is a sharer of block X, then the directory 150d sends a writeable copy of block X to processor 100a and invalidates all other sharers, if any exist. If directory 150d finds that processor 100a is no longer a sharer of block X, then the directory 150d knows an intervening write to block X has occurred after the Load Lock instruction from processor 100a. Thus, the Load Lock/Store Conditional instruction pair of processor 100a is invalid, and the directory 150d sends a Store Conditional Failure to processor 100a.

Figure 3:
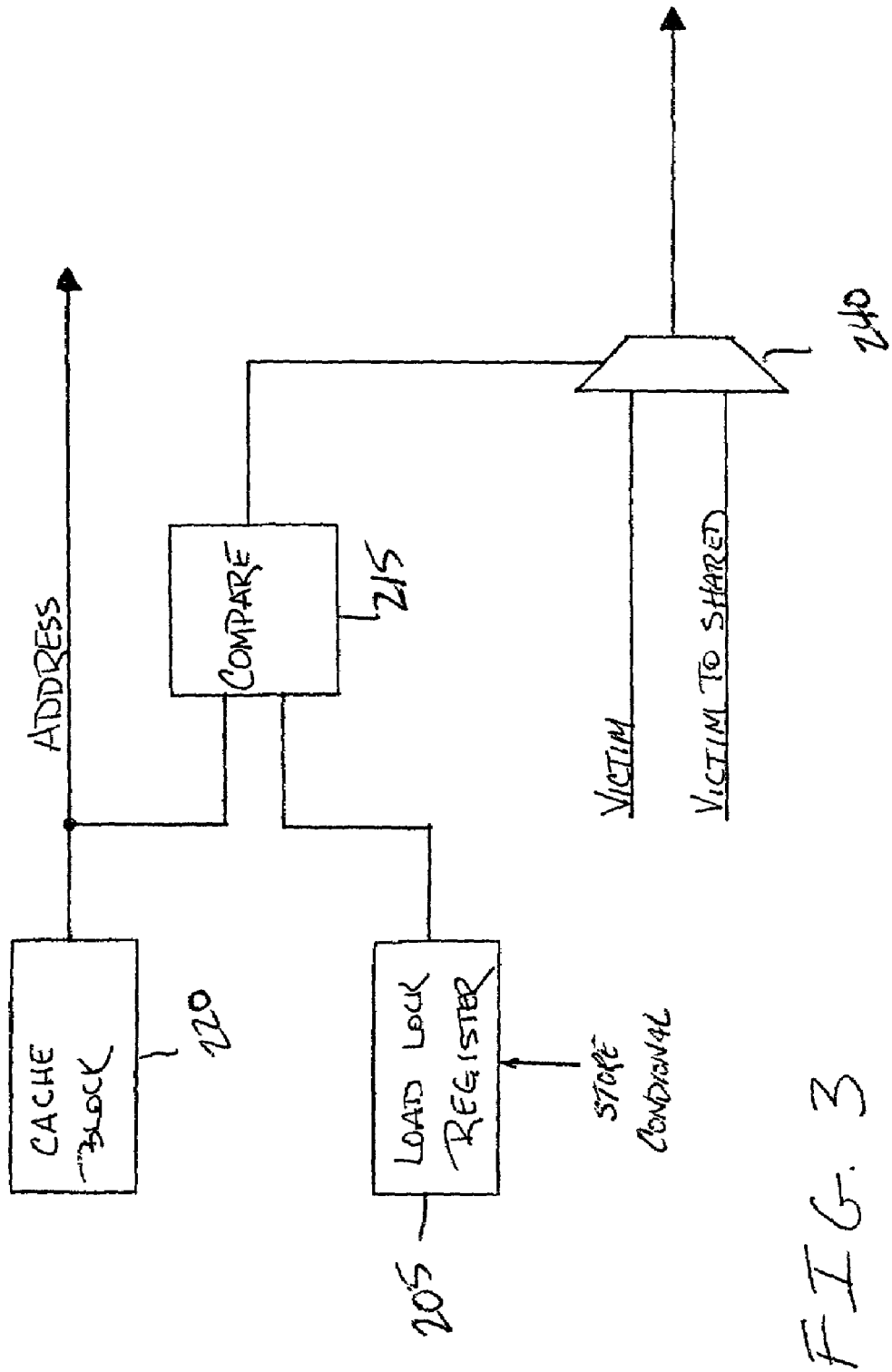
FIG. 3 shows an exemplary embodiment of a system to generate a Victim To Shared message if a Load Lock data block is displaced from a cache prior to executing a Store Conditional instruction.

As one skilled in the art will understand, the generation of the Victim To Shared message may be generated in many ways. One exemplary technique is depicted in FIG. 3. As shown in the exemplary embodiment of FIG. 3, a single register 205 is implemented for each program or thread, which records the address of the pending Load Lock/Store Conditional pair. Each register 205 preferably has an associated comparator 215. The output of comparator 215 functions as a select input to a multiplexer 240. The input signals to the multiplexer 240 are a Victim signal and a Victim To Shared signals. When an exclusive cache block 220 is displaced, the contents of the displaced data block register(s) 220 are compared to the address of the Load Lock register 205. If the addresses are the same, the comparator output selects the Victim To Shared message in multiplexer 240. As a result, the Victim To Shared message is delivered to the Home directory, rather than the Victim message that otherwise is transmitted with a displaced data block. As shown in FIG. 3, a Store Conditional signal causes the Load Lock register 205 to be reset.

The above discussion is meant to be illustrative of the principles and various embodiments of the present invention. Numerous variations and modifications will become apparent to those skilled in the art once the above disclosure is fully appreciated. For example, the directory states and encodings shown in Table 1, Table 2, and Table 3 may be extended to other encodings and directory states (e.g., a Shared4 state, sharing with four sharers) in the preferred embodiment of the invention. It is intended that the following claims be interpreted to embrace all such variations and modifications.

What is claimed is:

1. A distributed multiprocessing computer system, which includes a plurality of processors, each coupled to an associated memory module, wherein each of the associated memory modules stores data that is shared between said processors, said system comprising:

a Home processor that includes a memory block and a directory for said memory block in the associated memory module;

an Owner processor that includes a cache memory, and wherein said Owner processor obtains an exclusive copy of said memory block, and stores said exclusive copy of said memory block in said cache memory;

wherein said Owner processor begins write operations on said memory block and then displaces the exclusive copy of said memory block from said cache memory prior to completing the write operations on said memory block, and in response to displacing said memory block prior to completing the write operations said Owner processor returns said displaced copy of said memory block to said Home processor with a signal indicating that said Owner processor remains a sharer of said memory block; and wherein said Owner processor includes a register in which an address is stored representing a memory block obtained in response to a lock instruction, compares an address of any displaced data with the address stored in said register, and asserts a shared message if the address of any displaced data matches the address stored in said register.

2. The distributed multiprocessing computer system of claim 1, wherein said Owner processor obtains an exclusive copy of said memory block by issuing a Load Lock instruction, and wherein the directory associated with the Home processor indicates that said Owner processor has obtained exclusive control of said memory block.

3. The distributed multiprocessing computer system of claim 2, wherein said Owner processor executes multiple threads concurrently, and displaces data associated with a non-executing thread from its associated cache memory.

4. The distributed multiprocessing computer system of claim 1, wherein said lock instruction is a Load Lock instruction and said shared message is a Victim To Shared message.

5. The distributed multiprocessing computer system of claim 1, wherein a directory associated with the Home processor indicates that said Owner processor has become a sharer of said memory block in response to receiving said signal from said Owner processor.

6. The distributed multiprocessing computer system of claim 5, wherein said Owner processor subsequently re-obtains an exclusive copy of said memory block to complete execution of the non-executing thread.

7. The distributed multiprocessing computer system of claim 6, wherein the Owner processor asserts a Read-with-Modify Intent Store Conditional instruction to the Home directory to again request an exclusive copy of said memory block.

8. The distributed multiprocessing computer system of claim 7, wherein, in response to the Read-with-Modify Intent Store Conditional instruction, the Home directory determines if the Owner processor is a sharer of the memory block, and if so, the Home directory sends an exclusive copy of the memory block to the Owner processor.

9. The distributed multiprocessing computer system of claim 8, wherein the Home directory invalidates all other sharers when it sends an exclusive copy of the memory block to the Owner processor.

10. The distributed multiprocessing computer system of claim 7, wherein the Home directory determines if the Owner processor is a sharer of the memory block, and if not, the Home directory sends a Store Conditional Failure message to the Owner processor.

11. A method of maintaining memory coherence in a distributed shared memory computer system including a plurality of processors, comprising:

requesting a copy of a memory block from a Home processor to perform a write operation on the copy of the memory block;

storing said copy of said memory block exclusively in a cache memory associated with an Owner processor;

updating a coherence directory for said memory block in said Home processor to indicate the write operation on the copy of said memory block in said cache memory associated with the Owner processor;

displacing said copy of said memory block from said cache memory prior to completion of said write operation on said memory block;

in response to commencing but not completing said write operation, transmitting a message from said Owner processor to said Home processor relinquishing exclusive control of said memory block, said message indicating that said Owner processor should still be deemed a sharer of said memory block and wherein the copy of the memory block is requested using a Load Lock instruction from the Owner processor to the Home processor and transmitting a message includes assertion of a Victim To Shared message if an address of the displaced memory block matches an address of any memory block for which an exclusive copy resides in the Owner processor.

12. The method of claim 11, wherein the Load Lock instruction forms part of a Load Lock/Store Conditional instruction pair.

13. The method of claim 11, wherein the updating the coherence directory includes modifying a register to indicate that the Owner processor has an exclusive copy of the memory block.

14. The method of claim 11, wherein the coherency directory associated with the Home processor indicates that said Owner processor has become a sharer of said memory block in response to said Victim To Shared message.

15. The method of claim 14, further comprising the updating the coherence directory to indicate that said Owner processor has become a sharer of said memory block in response to said Victim To Shared message.

16. A method of maintaining memory coherence in a distributed shared memory computer system including a plurality of processors, comprising:

requesting a copy of a memory block from a Home processor to perform write operations on the copy of the memory block;

storing said copy of said memory block exclusively in a cache memory associated with an Owner processor;

updating a coherence directory for said memory block in said Home processor to indicate the write operation on the copy of said memory block in said cache memory associated with the Owner processor;

displacing said copy of said memory block from said cache memory prior to completion of the write operations on said memory block;

in response to commencing but not completing said write operations, transmitting a message from said Owner processor to said Home processor relinquishing exclusive control of said memory block said message indicating that said Owner processor should still be deemed a sharer of said memory block;

asserting a request to again obtain an exclusive copy of said memory block, wherein, in response to the request to again obtain an exclusive copy of the memory block the Home processor determines if the Owner processor is a sharer of the memory block and if so, the Home processor sends an exclusive copy of the memory block to the Owner processor; and wherein the copy of the memory block is requested using a lock instruction from the Owner processor to the Home processor and the Owner process transmits a share message if an address of the displaced memory block matches an address of any memory block for which an exclusive copy resides in the Owner processor.

17. The method of claim 16, wherein the Home processor invalidates all other sharers when it sends an exclusive copy of the memory block to the Owner processor.

18. The method of claim 16, wherein, in response to the request to again obtain an exclusive copy of the memory block, the Home processor directory determines if the Owner processor is a sharer of the memory block, and if not, the Home directory sends a Store Conditional Failure message to the Owner processor.

19. A distributed multiprocessing computer system, comprising:

a first processor that includes a memory block and a directory associated with said memory block that tracks a status of said memory block;

a second processor that includes a cache memory, and wherein said second processor requests an exclusive copy of said memory block and stores said memory block in said cache memory;

wherein said second processor begins processing of said memory block and then displaces the exclusive copy of said memory block prior to completing the processing of said memory block, and in response to displacing said memory block but not completing the processing said second processor transmits a signal to said first processor indicating that said second processor relinquishes exclusive control of said memory block but should remain a sharer of said memory block; and wherein said second processor includes a register in which an address is stored representing a memory block obtained in response to a lock instruction, compares an address of any displaced data with the address stored in said register, and asserts a shared message if the address of any displaced data matches the address stored in said register.

20. The distributed multiprocessing computer system of claim 19, wherein said second processor obtains an exclusive copy of said memory block by issuing a Load Lock instruction, and wherein the directory associated with the first processor indicates that said second processor has obtained exclusive control of said memory block.

21. The distributed multiprocessing computer system of claim 19, wherein said second processor executes multiple threads concurrently, and displaces data associated with a non-executing thread from its associated cache memory.

22. The distributed multiprocessing computer system of claim 19, wherein the shared message is a Victim To Shared message.

23. The distributed multiprocessing computer system of claim 22, wherein the directory associated with the first processor indicates that said second processor has become a sharer of said memory block in response to said Victim To Shared message.

24. The distributed multiprocessing computer system of claim 19, wherein said second processor subsequently re-obtains an exclusive copy of said memory block from said first processor to complete processing of said memory block.

25. The distributed multiprocessing computer system of claim 24, wherein the second processor asserts a request to read, modify, and conditionally store said memory block to said first processor.

26. The distributed multiprocessing computer system of claim 25, wherein, in response to the request to read, modify, and conditionally store said memory block, the first processor determines if the second processor is a sharer of the memory block, and if so, the first processor sends an exclusive copy of the memory block to the second processor.

27. The distributed multiprocessing computer system of claim 26, wherein the first processor invalidates all other copies of said memory block when it sends an exclusive copy of the memory block to the second processor.

28. The distributed multiprocessing computer system of claim 25, wherein, in response to the request to read, modify, and conditionally store said memory block, the first processor determines if the second processor is a sharer of the memory block, and if not, the first processor sends a failure message to the second processor.

* * * * *

UNITED STATES PATENT AND TRADEMARK OFFICE
CERTIFICATE OF CORRECTION

PATENT NO. : 7,620,954 B2 Page 1 of 1
APPLICATION NO. : 09/924934
DATED : November 17, 2009
INVENTOR(S) : Matthew C. Mattina et al.

It is certified that error appears in the above-identified patent and that said Letters Patent is hereby corrected as shown below:

In column 12, line 11, in Claim 11, delete "block" and insert -- block; --, therefor.

Signed and Sealed this

Sixteenth Day of March, 2010

David J. Kappos
*Director of the United States Patent and Trademark Office*